United States Patent [19]

Tanaka

[11] 3,892,904

[45] July 1, 1975

[54] GLASS CERAMIC ARTICLE HAVING A METALLIC COATING LAYER IN A LOCALIZED AREA OR ITS SURFACE AND METHOD OF MAKING THE SAME

[75] Inventor: Takeshi Tanaka, Nagoya, Japan

[73] Assignee: Ishizuka Garasu Kabushiki Kaisha, Aichi-ken, Japan

[22] Filed: July 2, 1973

[21] Appl. No.: 375,693

[52] U.S. Cl. ................. 428/209; 65/30; 65/32; 65/33; 65/60; 428/210; 428/429; 428/433
[51] Int. Cl. ................. B32b 17/06; B32b 15/04
[58] Field of Search ........... 161/193, 196, 225, 188, 161/146, 164, 166; 65/30, 32, 33, 59, 60; 117/123 B, 124 C

[56] References Cited
UNITED STATES PATENTS

| | | | |
|---|---|---|---|
| 3,266,912 | 8/1966 | Murphy | 106/1 |
| 3,420,645 | 1/1969 | Hair | 65/21 |
| 3,460,927 | 8/1969 | Fischer | 65/32 |
| 3,464,806 | 9/1969 | Seki | 65/30 |
| 3,490,887 | 1/1970 | Herczog | 65/33 |
| 3,704,110 | 11/1972 | Finn | 65/32 |
| 3,775,154 | 11/1973 | Grego | 117/38 |
| 3,790,360 | 2/1974 | Kato | 65/30 |
| 3,802,892 | 4/1974 | Pirooz | 161/196 |

FOREIGN PATENTS OR APPLICATIONS
944,571   12/1963   United Kingdom

*Primary Examiner*—George F. Lesmes
*Assistant Examiner*—Ellis P. Robinson
*Attorney, Agent, or Firm*—Sherman & Shalloway

[57] ABSTRACT

A glass-ceramic article having in a localized area of its surface a coating layer of copper and/or silver integrally bonded to the glass-ceramic body, in which the surface having the metallic layer does not protrude outwardly beyond the adjacent surface not having a metallic layer. And as one method of making such an article, there is provided a method comprising putting adjacently together a molten mass of a glass-ceramic-forming composition (A) and a molten mass of a glass-ceramic-forming composition (B) containing a small quantity of a copper and/or silver compound, forming the resulting mass into a glass article, and thereafter heating the formed glass article in a reducing atmosphere to devitrify the glass article while causing the formation of a metallic layer in only the exposed area of the surface of the glass of composition (B).

2 Claims, No Drawings

GLASS CERAMIC ARTICLE HAVING A METALLIC COATING LAYER IN A LOCALIZED AREA OR ITS SURFACE AND METHOD OF MAKING THE SAME

This invention relates to a glass-ceramic article having a metallic coating layer of copper and/or silver in a localized area of its surface and a method of making the same.

The novel glass-ceramic article obtained in accordance with the present invention has a metallic coating layer of copper and/or silver in a localized area of its surface. Another feature is that the metallic coating layer is integrally bonded to the glass-ceramic body through the intermediary of an intermediate layer consisting of fine dispersion of metal and metal oxides in the glass matrix, with the consequence that the adhesiveness of the metallic coating layer to the glass-ceramic body is exceedingly great. A further feature is that the surface having the metallic coating layer does not protrude outwardly beyond the adjacent surface which does not have a metallic coating layer, i.e., the profile at the portion where the two surfaces adjoin each other is substantially even.

Glass-ceramics or devitroceramics, as is well known, are crystalline ceramics, which are made by the crystallization of a glass body under controlled conditions. Glass-ceramic articles are made by melting by means of the conventional glass making techniques a glass-ceramic-forming batch containing a nucleating agent and/or a crystallization accelerator, shaping the resulting melt, and thereafter heat treating the shaped article under controlled conditions. The shaped glass article is devitrified by this heat treatment; in other words, the shaped glass article is transformed into a glass-ceramic composed of minute crystals dispersed nearly uniformly throughout the glass matrix. Since glass-ceramic articles and the methods of making the same are exceedingly well known, it is believed that a further detailed description need not be given.

In coating localized areas of a surface of a glass-ceramic article with a metallic layer, it has been common practice in the past to deposit the metal by such methods as vacuum plating, painting, baking, spattering, nonelectroplating or the like. Alternately, the whole surface of the article was first deposited with the metal, and thereafter the unnecessary portions were shaved or etched off to leave the desired area coated with the metallic layer.

However, in all of the foregoing conventional methods the metal was merely applied to the surface of the glass-ceramic article from the outside, and hence the metallic coating layer formed was merely physically adhered to the glass article, with the consequence that with its adhesiveness being weak, it would readily strip off. In addition, in the case of the metallic layer applied to localized areas or left locally after removing the unnecessary portions, the area having the metallic layer protrudes outwardly to an extent equal to at least the thickness of the metallic layer. Thus, it was impossible to obtain a final article having an even or smooth surface. Hence, a glass-ceramic article having the various features such as hereinbefore described, as in the case of the article of the present invention, had not existed at all heretofore.

Next, a method which has made possible the production of a glass-ceramic article having the foregoing various features will be described. This method comprises putting adjacently together a molten mass of a glass-ceramic-forming composition (A) and a molten mass of a glass-ceramic-forming composition (B) which is substantially the same as (A) but further contains 0.05 to 5 percent by weight, calculated as the metal based on the weight of the glass composition, of at least one compound of a metal selected from copper and silver, at a temperature which is sufficient to maintain the masses tacky, thereby to bond the masses intimately with each other; forming the bonded masses into a glass article of a desired configuration; and heating the formed glass article in a reducing atmosphere to devitrify the glass article while causing the metallic ions generated from said metal compound contained in glass composition (B) to migrate through the glass and diffuse to the surface of glass comprising glass composition (B), and to reduce the metallic ions to their metallic state at the surface of glass composition (B) exposed to the reducing atmosphere, whereby a metallic layer is formed only in the exposed area of the surface of glass composition (B) in the devitrified article.

Preferred embodiments of practicing the above-described method will be more fully described below.

The method of producing a glass-ceramic article having a metallic layer of copper and/or silver over the whole of its surface is known hitherto from Japanese Patent 479,655, U.S. Pat. No. 3,464,806, German Patent 1,496,540 and French Patent 1,383,611. The method comprises melting a glass-forming batch containing a nucleating agent and 0.05 to 5 percent by weight, calculated as the metal based on the total weight of the glass-forming composition, of at least one compound of a metal selected from copper and silver, forming the melt into a glass article of a desired configuration, and heating the formed glass article in a reducing atmosphere to devitrify the glass while causing the metallic ions generated from said metal compound to migrate through the glass matrix and diffuse to the surface of said devitrified article, and to reduce the metallic ions to the state of metallic particles at the surface by said reducing atmosphere. Further, an improved method of obtaining a glass-ceramic article having a much more improved metallic layer on its surface, by submitting the article subsequent to its heat treatment in a reducing atmosphere in the hereinabove-described method, to a heat treatment in an oxidizing atmosphere followed by again heat treating the article in a reducing atmosphere is disclosed in U.S. Pat. No. 3,790,360.

The mechanism and operating conditions by which the metallic layer is formed in this invention are identical to those of the method described hereinabove. However, in forming the metallic layer in a localized area of the surface of the glass-ceramic article, a molten glass of a glass-ceramic-forming composition (A), i.e., a glass-forming composition containing a nucleating agent, and a molten mass of glass-ceramic-forming composition (B) containing a nucleating agent and the copper compound and/or silver compound are brought together adjacently, following which the resulting mass is formed into a bonded glass article, and the so formed article is heat treated in a reducing atmosphere. Following the heat treatment in the reducing atmosphere, it is possible in accordance with the aforementioned improved method to heat treat the article in an oxidizing atmosphere and thereafter again heat treat this article in a reducing atmosphere.

The glass itself of compositions (A) and (B) need not necessarily be the same. However, to facilitate the formation of a single article by the bonding of these glasses, it is preferred that the compositions of the two are substantially the same. When bringing the molten mass of these two glasses together adjacently, it is important that both masses are maintained at a sufficiently high temperature, i.e., that both masses are maintained in a tacky state such that their viscosities are about 10 to 10 poises. When the viscosities deviate from this range, difficulty is experienced in forming a strong single article by the intimate bonding of the two masses. The article can be made into any desired configuration such as a flat sheet, curved sheet, tube, bottle and the like. For instance, a sheetlike glass article can be formed by first casting one of the molten masses of glass compositions, either (A) or (B), into a mold for forming a sheet and then casting the other mass on top of the first thereby bonding the two adjacently. At this time, if desired, glasses of (A) and (B) can be repeatedly cast in alternation to form a multilayered sheet article. Articles having the form of a tube or a bottle can be made, for instance, by blowing the adjacently bonded molten masses of glass compositions (A) and (B).

The glass article formed as described above is first cooled and thereafter submitted to the devitrifying step by heat treating in a reducing atmosphere, whereupon the glass article is devitrified and concurrently therewith the metallic ions generated from the copper and/or silver compound contained in the glass of composition (B) migrate and are reduced to the metallic state at the surface thereof which is exposed to the reducing atmosphere. Thus, a glass-ceramic article having a metallic layer of copper and/or silver in a localized area of the surface is obtained. The thickness of this metallic layer is about 0.5 – 2 microns in general. Since this metallic layer is formed by the reduction to a metallic state at the surface of the glass article of the metailic ions which migrate through the glass matrix and become exposed to the reducing atmosphere at the surface, this metallic layer does not protrude outwardly beyond the surface. Hence, the profile at that portion where the surface having the metallic layer and the surface not having a metallic layer adjoin is substantially even. Below the metallic layer and continuing therefrom an intermediate layer consisting of the foregoing metal and oxides thereof which are finely dispersed in the glass matrix is formed. The reason for this is that the reducing capacity of the reducing atmosphere gradually weakens as it becomes more remote from the surface. This intermediate layer extends to a depth of about 20 or more microns from the surface. Thus, since the metallic layer is integrally bonded to the glass-ceramic body through the intermediary of the aforesaid intermediate layer, its adhesiveness is exceedingly strong, usually being about 1.0 – 2.0 kg/mm . This adhesiveness is far greater than that of the metallic layer which is formed on the surface of the glass body from its outside as in the case of vacuum plating, electroless plating and other means of depositing the metallic layer.

As described above, the metallic layer is formed on only the surface of the glass of composition (B) exposed to the reducing atmosphere, there being no formation of a metallic layer on the exposed surface of the glass of composition (A). This phenomenon can be explained as follows: The migration and diffusion of the metallic ions generated from the metal compound contained in the glass of composition (B) increase in concomitance with the progress of the devitrification, i.e., the crystallization, of the glass. When the metallic ions thus reach the zone where oxygen is deficient, i.e., the zone near the glass surface in a reducing atmosphere, these ions become colloidal. These colloids then start to grow by absorption of the metallic ions present in the vicinity, after which these grown colloids, while continuing to aggregate, diffuse through the crystallized glass matrix to the surface of the glass article which, being exposed to a reducing atmosphere, is deficient in oxygen. On the other hand, since the glass of composition (A), though disposed adjacent the glass of composition (B), does not contain a metal compound therein, the metallic ions formed in the glass of composition (B) can neither migrate into the matrix of the glass of composition (A) nor become colloidal, with the consequence that a metallic layer is not formed on the surface of the glass of composition (A).

In practicing the invention method, the conventional techniques pertaining to the devitrification of glass and the formation of a metallic layer of copper and/or silver on the surface of a devitrified glass can be employed without modification. These conventional techniques are disclosed in the hereinbefore-mentioned patents and hence it is believed that a detailed description is not necessary. However, by way of reference, the following brief description of these techniques will be given.

While there is no particular restriction as regards the composition of the starting glass batch for making the glass ceramic article, the following systems are usually used conveniently: silica-alumina-lithia, silica-alumina-lithia-magnesia, silica-alumina-lithia-zinc oxide, silica-alumina-magnesia, silica-alumina-calcium oxide and silica-lithia. As other components, these may also contain, for example, boron oxide, sodium oxide, potassium oxide, lead oxide, etc.

As the nucleating agent, conveniently usable are titania, zirconia, fluorine, phosphorous pentoxide, titania-zirconia, titania-zirconia-fluorine, zirconia-fluorine, titania-fluorine, phosphorous pentoxide-fluorine, titania-phosphorous pentoxide, zirconia-phosphorous pentoxide, titania-phosphorous pentoxide-fluorine, zirconia-phosphorous pentoxide-fluorine, titania-zirconia-phosphorous pentoxide and titania-zirconia-phosphorous pentoxide-fluorine. These nucleating agents may also contain as additional components calcium fluoride, tin oxide, berylium oxide, chromium oxide, vanadium oxide, nickel oxide, arsenic oxide, molybdenum oxide, etc.

The metal compound to be added to the glass batch as the metallic layer-forming source includes copper and silver compounds and mixtures thereof. As the compound for this purpose, mention can be made of the oxides of these metals and those compounds which are capable of being transformed to oxides by oxidation at elevated temperatures, such, for example, as the halides, sulfites, sulfates, nitrates, phosphates, hydroxides, etc.

The devitrification of the glass article and formation of the metallic layer are carried out by heating the article gradually up to the glass transition point, preferably at a rate not exceeding 5 C. per minute, and thereafter holding the article for from about 15 minutes to about 5 hours at a temperature ranging between the glass transition point and the melting point of the metal which is to form the layer.

The reducing atmosphere may be made up of, say, hydrogen, carbon monoxide, or such combustible gases as methane, ethane, propane, butane, town gas, etc.

As can be appreciated from the foregoing discussion, the method of making a glass-ceramic article having a metallic layer of copper and/or silver in a localized area of the surface in accordance with the present invention, when compared with the conventional methods wherein the metal is applied to the surface of the glass article from the outside, is not only much easier to carry out but also less liable to produce unsatisfactory articles. Hence, the method of the invention is advantageous and very economical. In addition, the resulting article, as previously indicated, possesses exceedingly superior features.

The articles of this invention find use as material for the manufacture of electric and electronic equipment and parts thereof such as bases of printed circuit components, condensers, communication equipment, calculating machines, etc. Further, they can be used for various decorative articles and articles of daily use in view of their pleasing appearance.

EXAMPLE 1

As the glass-ceramic-forming composition (A) was used the composition (% by weight) given below, while the same composition as (A) except containing 0.5 % by weight of cuprous oxide was used as the glass composition (B).

Composition of (A): $SiO_2$ 55.0, $Al_2O_3$ 17.5, $Li_2O$ 3.0, MgO 10.0, $ZrO_2$ 5.5, F 8.0, BeO 1.0.

Batches of glass compositions (A) and (B) were separately heated in furnaces for 5 hours at 1450° – 1480°C., and molten masses of (A) and (B) were separately prepared. The molten mass of composition (B) was gathered at the end of a blowpipe and, while it was sufficiently hot, the molten mass of composition (A) was gathered around the mass of (B). The resulting bonded mass was blown to form a tubular article having an inside diameter of 6.0 mm and an outside diameter of 10.0 mm, which was then heated to 1000°C. at a rate of 5°C. per minute in a hydrogen atmosphere, and was held there at the temperature for 60 minutes, followed by cooling to room temperature. The tubular product so obtained was a glass-ceramic having the crystalline phases of β-spodumene. Consequently, the metallic layer of copper was formed only on the exposed surface of the glass of composition (B) making up the inner wall of the product.

EXAMPLE 2

A cylindrical glass bar containing the glass of the below specified composition (A) and having in the axial portion thereof the glass of the below described composition (B) extending longitudinally from one end to the other end thereof was heat treated at 980°C. in a hydrogen atmosphere. A coating of silver was deposited only on the two exposed ends of the glass of composition (B) making up the axis of the devitrified product.

Glass composition (A): $SiO_2$ 59.5 %, $Al_2O_3$ 20.0 %, $Li_2O$ 6.0 %, MgO 3.0 %, $ZrO_2$ 3.0 %, F 4.0 %, $TiO_2$ 1.5 %, $B_2O_3$ 3.0 %.

Glass composition (B): A composition consisting of 100 parts of the above composition (A) to which had been added 1.5 parts of $Ag_2O$.

What is claimed is:

1. In a glass-ceramic article having, in localized areas of its surface, layers of at least one metal selected from the group consisting of copper and silver, said metallic layers formed by in situ metallic ion migration and not protruding outwardly beyond the adjacent surface not having the metallic layers and being integrally bonded to the glass-ceramic body through the intermediary of intermediate layers consisting of the metal and the oxides thereof, which are finely dispersed in the subjacent glass matrix, the improvement wherein the glass-ceramic article consists essentially of: a first glass-ceramic forming composition (A); and a second glass-ceramic forming composition (B), which is substantially the same as (A) but further contains from 0.5 to 5.0 percent by weight of the above metal, calculated as the metal based on the weight of the glass composition of at least one compound of said metals; said compositions (A) and (B) being bonded in such a manner that composition (B) is subjacent to the localized surface areas having the metallic layers and composition (A) comprises at least all of the remaining surface areas.

2. The article of claim 1 wherein the metallic layer is from about 0.5 to about 2.0 microns thick.

* * * * *